US005387298A

United States Patent [19]

Takagi et al.

[11] Patent Number: 5,387,298

[45] Date of Patent: Feb. 7, 1995

[54] APPARATUS AND METHOD FOR BONDING SHEET MATERIAL AND ITS APPLICATION TO MANUFACTURE OF FLEXIBLE FLAT CABLE

[75] Inventors: Masazumi Takagi; Toshio Onuma; Tatsuya Watanabe; Toshiaki Enami, all of Chiba; Kazuo Tanihira, Aomori; Hirotaka Sawada, Chiba; Kuni Yoshinuma, Chiba; Hiroaki Komatsuda, Chiba, all of Japan

[73] Assignee: Fujikura Ltd., Tokyo, Japan

[21] Appl. No.: 50,593

[22] Filed: Apr. 22, 1993

[30] Foreign Application Priority Data

| | | | |
|---|---|---|---|
| Apr. 23, 1992 | [JP] | Japan | 4-104962 |
| May 22, 1992 | [JP] | Japan | 4-131091 |
| May 22, 1992 | [JP] | Japan | 4-131092 |
| May 22, 1992 | [JP] | Japan | 4-131093 |
| Jul. 23, 1992 | [JP] | Japan | 4-197264 |

[51] Int. Cl.[6] .................. H01B 13/18; H02N 13/00

[52] U.S. Cl. .................. 156/47; 156/250; 156/263; 156/273.1; 156/302; 156/353; 156/354; 156/511; 156/519; 156/568; 226/94; 29/900; 198/691; 83/881; 83/602; 83/346

[58] Field of Search .................. 156/47, 273.1, 519, 156/263, 250, 302, 353, 354, 511, 568; 226/94; 29/900; 198/691; 83/267, 881, 861, 863, 886, 887, 602, 346, 305

[56] References Cited

U.S. PATENT DOCUMENTS

| | | | |
|---|---|---|---|
| 2,543,220 | 2/1951 | Ardell | 156/521 |
| 2,853,662 | 12/1974 | Yazawa et al. | 156/273.1 X |
| 3,342,129 | 9/1967 | Weigl | 226/94 X |
| 3,346,253 | 10/1967 | Paschke | 226/94 |
| 3,586,586 | 6/1971 | Berg | 156/519 X |
| 3,835,756 | 9/1974 | Bosse | 156/519 X |
| 3,963,557 | 6/1976 | Patterson | 156/519 |
| 4,171,239 | 10/1979 | Hirsch et al. | 156/519 X |
| 4,642,085 | 2/1987 | Helm | 156/519 X |

FOREIGN PATENT DOCUMENTS

| | | |
|---|---|---|
| 0014686 | 2/1980 | European Pat. Off. . |
| 0051076 | 10/1980 | European Pat. Off. . |
| 0221840 | 11/1986 | European Pat. Off. . |
| 1-183010 | 7/1989 | Japan . |

*Primary Examiner*—Michael W. Ball
*Assistant Examiner*—Francis J. Lorin
*Attorney, Agent, or Firm*—Oblon, Spivak, McClelland, Maier & Neustadt

[57] ABSTRACT

There is disclosed an apparatus and method for bonding a sheet material to an elongated base material, in which the sheet material is transferred by a transferring device towards the base material, and the sheet material is bonded by a bonding device to the base material. A static electricity generating device is attached to the bonding device for generating static electricity on the sheet material to cause the sheet material to adhere to the bonding device, so that the sheet material is prevented from falling from the bonding device prior to the bonding step. Furthermore, an apparatus and method for manufacturing a flexible flat cable, applying the above bonding apparatus and method is also disclosed. In this apparatus and method, a pair of insulating tape sheets are transferred towards electric conductors. Prior to the bonding step at a pair of hot rolls, the insulating tape sheets adhered to the hot rolls are cut into discrete tapes, and the discrete tapes are prevented from falling from the hot rolls by the static electricity generated thereon. With this apparatus and method, not only a substantial reduction in the cost of materials but also an enhanced productivity of the flexible flat cables can be ensured, and the problem of noise generated by press machines can be avoided.

8 Claims, 5 Drawing Sheets

APPARATUS AND METHOD FOR BONDING SHEET MATERIAL AND ITS APPLICATION TO MANUFACTURE OF FLEXIBLE FLAT CABLE

BACKGROUND ART

The present invention pertains to an apparatus and method for bonding a sheet material to an elongated base material, and its application to the manufacture of flexible flat cables.

An apparatus for manufacturing a flexible flat cable or an electric tape cable, as depicted in FIG. 1, is one of the known apparatuses of the type that are used to bond a sheet material to an elongated base material. In the flat cable-manufacturing apparatus as shown, a plurality of flat rectangular electric conductors 100, arranged parallel to one another in an elongated manner, are continuously transferred on rolls and caused to run between a pair of hot rolls 101. Two insulating tape sheets 102 are also guided by guide rolls 103 to be placed on top of and underneath the conductors 100 and are bonded thereto by the hot rolls 101 to provide a flexible flat cable blank 104. In order to provide lead openings for the conductors 100 while leaving connecting portions 102a necessary for the continuous transport of the sheet, rectangular holes 105 as shown in FIG. 2 are formed in each insulating tape sheet 102 by a respective press machine 106 prior to the bonding step, and, following the bonding step, widthwise margins of the resulting flexible flat cable blank 104, indicated by two-dot and dash lines X in FIG. 3, are cut by a slitting device (not shown) to remove the aforesaid connecting portions, i.e., the portions indicated by the numeral **102*a*, as well as the marginal portions 102*b*** which are in excess of the predetermined width of a finished flexible flat cable.

In the aforesaid known apparatus, however, the debris of the insulating tape sheets 102 produced by forming the holes 104 as well as their connecting and marginal portions **102*a* and 102*b* to be removed are wasteful and lead to an increased cost for raw materials. In addition, when the size of the rectangular holes 105** must be changed to manufacture flexible flat cables of different sizes, the resetting of the press machines is required, resulting in diminished productivity. Furthermore, the noise of the press machines in operation is unduly great.

A possible solution to the problems posed, is to cut discrete tapes from each insulating tape strip traveling on the hot rolls 101, prior to the subsequent bonding step. However, once the insulating tape strips are cut into discrete tapes, they tend to easily fall from the hot rolls 101 before they reach the position where they are bonded to the conductors 100.

SUMMARY OF THE INVENTION

It is therefore a primary object and feature of the present invention to provide a bonding apparatus and method which permits the bonding of a sheet material to an elongated base material without causing the sheet material to fall from a bonding device, so that it is suitably adapted for use in the manufacture of flexible flat cables.

Another object of the invention is to provide an apparatus and method for manufacturing a flexible flat cable, which achieves not only a substantial reduction of material costs but also an enhanced productivity, and further circumvents the problem of noise generated by press machines.

According to a primary aspect of the present invention, there is provided an apparatus for bonding a sheet material to an elongated base material, comprising a transferring device for transferring the sheet material towards the base material and a bonding device for bonding the sheet material being transferred by the transferring device to the base material. A device generating static electricity is disposed adjacent to the bonding device for generating static electricity on the sheet material to cause the sheet material to adhere to the bonding device. With this construction, the sheet material is prevented from falling from the bonding device prior to the bonding step.

In the foregoing, the base material and the sheet material may be an elongated electric conductor and an insulating tape sheet, respectively. Further, the base material may be a flexible flat cable itself, and the sheet material may be an additional tape such as a reinforcing tape or polymido resin tape. Furthermore, it is preferable that the static electricity generating device comprise a high voltage source means and a static electricity electrode means arranged in opposed relation to the bonding device and electrically connected to the high voltage source means.

In another aspect of the invention, there is provided a bonding method, in which the sheet material, which is transferred towards the elongated base material, is bonded to the base material by a bonding device. During the transfer of the sheet material prior to the bonding step, static electricity is generated on the sheet material, so that the sheet material is caused to adhere to the bonding device. Hence, the sheet material is prevented from falling from the bonding device before it is bonded to the base material.

In this bonding method, the sheet material may be prepared in advance in conformity with the width of a finished product such as a flexible flat cable, and in such a case, it is preferable that, during the transfer of the sheet material and base material, the position of the sheet material in its widthwise direction is adjusted so as to be aligned with the width of the base material. Furthermore, a cutting device in the form of a cutter roll having a cutter blade provided thereon may be provided adjacent to the bonding device, and by operating the cutting device, the sheet material may be cut into discrete tapes prior to bonding. Before and after the cutting operation, the transfer speed of the sheet material being transferred by the transferring device may be synchronized to that of the base material, while at other times, the transfer speed of the sheet material may be changed. With these procedures, the lengths of the discrete tapes, that is, the cutting pitches of the sheet material, can be controlled in the desired manner, According to yet another aspect of the present invention, there is provided an apparatus for manufacturing a flexible flat cable, which comprises a first transferring device for transferring a plurality of elongated electric conductors, and a pair of second transferring devices for transferring a pair of insulating tape sheets or strips towards the electric conductors. A pair of hot rolls, having axes of rotation parallel to each other, are provided for permitting the electric conductors and the insulating tape sheets to run therebetween and thermally bond in the same manner as described above. A pair of cutting devices are disposed adjacent to the hot rolls, respectively, for cutting discrete tapes from the insulating tape sheets prior to bonding, and a pair of static electricity-generating devices are disposed adjacent to the hot rolls, respectively, for generating static electricity on the insulating tape sheets which causes the sheets to adhere to the hot rolls, and thereby the discrete tapes are prevented from falling from the hot rolls prior to the bonding step.

In the apparatus thus constructed, the insulating tape sheets are cut into discrete tapes and subsequently bonded to the electric conductors. Therefore, it is not necessary to form holes in the insulating tape sheets and to remove the connecting portions thereof, resulting in a substantial reduction of raw materials. In addition, since no holes are to be formed in the insulating tape sheets, it is not necessary to operate press machines, so that the resetting and noise of the press machines can be eliminated.

Each cutting device may include a cutter roll disposed adjacent to a respective hot roll and having an axis parallel to the axis of rotation of the hot roll. The cutter roll has a cutter blade provided thereon, and has cutter cam means constructed to be held in abutment with the hot roll in order to maintain a gap between the cutter blade and the hot roll during the cutting of the insulating tape sheet. With the provision of this cutter cam means, the functional lifetime of both the cutter blade and the hot roll can be prolonged. In addition, in order to ensure a smooth rotation of the hot roll, each cutting device may include roll cam means which is operative for moving the cutter roll to the closest possible position to the hot roll when the insulating tape sheet arrives at a predetermined cutting position. In the event that the cutter roll does not cut the tape sheet completely, the cutter roll may effect a scoring function and cooperates with the transferring device to provide a cutting function.

Furthermore, the hot rolls and second transferring devices may be driven by a drive device which includes a main motor for rotating the hot rolls at a prescribed rotational speed, a pair of differential gear mechanisms each having an input shaft connected to the main motor, an output shaft connected to a respective second transferring device and a control shaft, a pair of control motors each mounted on a respective control shaft and being operative to produce a rotational force of a variable rotational speed, and control means connected to the control motors for controlling the control motors. In this drive device, as the rotational speed of a respective control motor is changed by the control unit, each differential gear mechanism operates to change the rotational speed of the output shaft relative to the rotational speed of the input shaft. Accordingly, the timing of the cutting of the insulating tape sheets, that is, the lengths of the discrete tapes for the flexible flat cable, can be controlled reliably and easily by the manipulation of the control unit.

Moreover, each second transferring device may be constructed to include a transfer roll assembly, and also a pair of sensing devices may be arranged between the transfer roll assembly and the hot roll to sense a widthwise position of the insulating tape sheet traveling from the transfer roll assembly to the hot roll to produce a signal indicating the widthwise position of the insulating tape sheet. Further, a pair of moving mechanisms may be attached to the second transferring devices, respectively, for moving them based on the signals from the sensing devices.

Furthermore, a pair of sensing means may be attached to the hot rolls for sensing positions of the outer peripheral surfaces of the hot rolls to produce signals indicating the positions of the outer peripheral surfaces thereof. Then, by providing adjusting means to at least one of the hot rolls, at least one of the hot rolls may be moved based on the signal from the sensing means to thereby maintain a uniform bonding position between the hot rolls.

According to a further aspect of the invention, there is provided a method for manufacturing a flexible flat cable, which comprises transferring a plurality of elongated electric conductors, and transferring a pair of insulating tape sheets towards the electric conductors. Although the electric conductors and the insulating tape sheets are caused to run between a pair of hot rolls and to be thermally bonded to each other, the insulating tape sheets are cut into discrete tapes prior to the bonding to the conductors. Before and after the cutting operation, static electricity is generated on the insulating tape sheets, so that the insulating tapes are caused to adhere to the hot rolls and prevented from falling therefrom prior to the bonding step.

BRIEF DESCRIPTION OF THE DRAWINGS

These and other features, aspects, and advantages of the present invention will become better understood with regard to the following description, appended claims, and accompanying drawings wherein:

Figure 1:
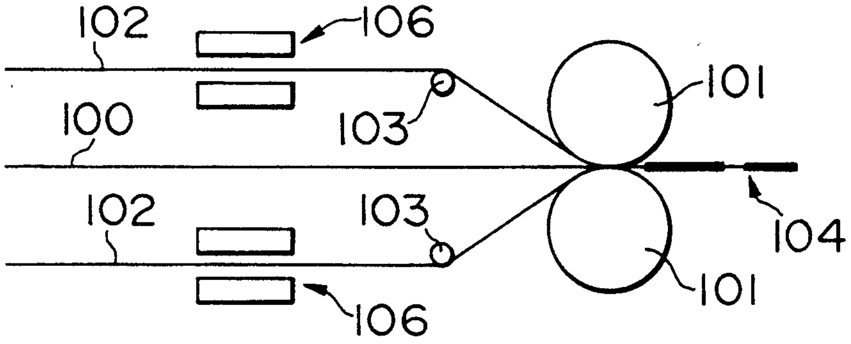
FIG. 1 (PRIOR ART)
FIG. 1 is a schematic view of a conventional apparatus for manufacturing a flexible flat cable.
Figure 2:
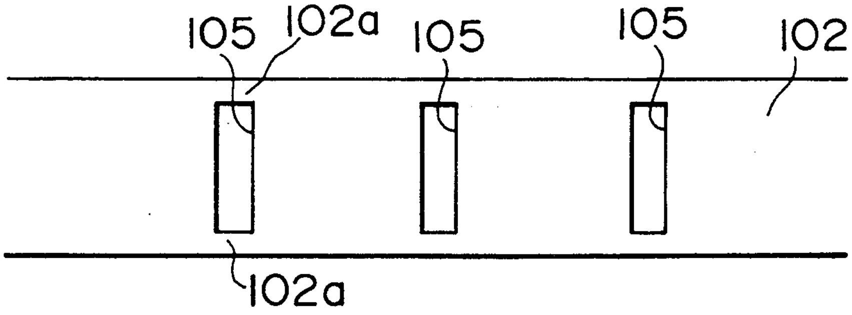
FIG. 2 (PRIOR ART)
FIG. 2 is a plan view showing an insulating tape immediately after having passed through a press machine of the apparatus of FIG. 1.
Figure 3:
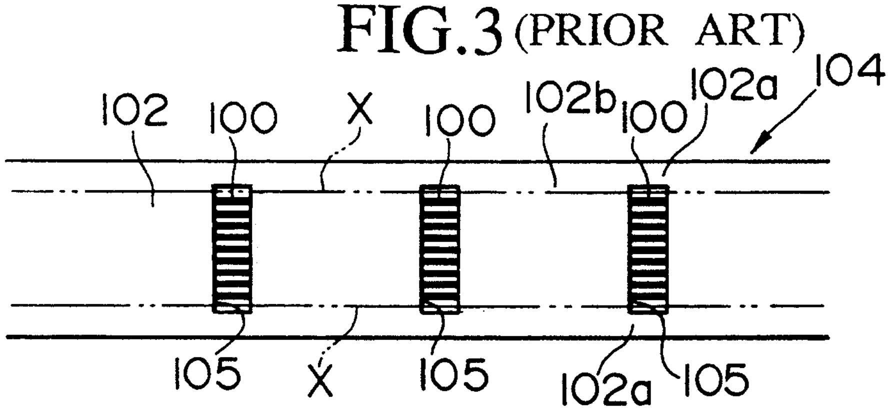
FIG. 3 (PRIOR ART)
FIG. 3 is a plan view showing a flexible flat cable prior to finishing by a slitting device using the conventional apparatus.
Figure 18:
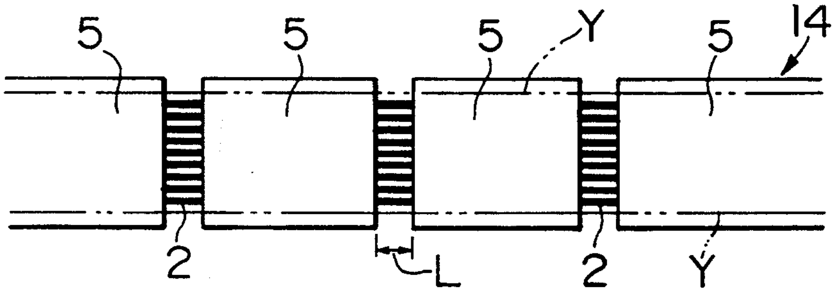
Figure 4:
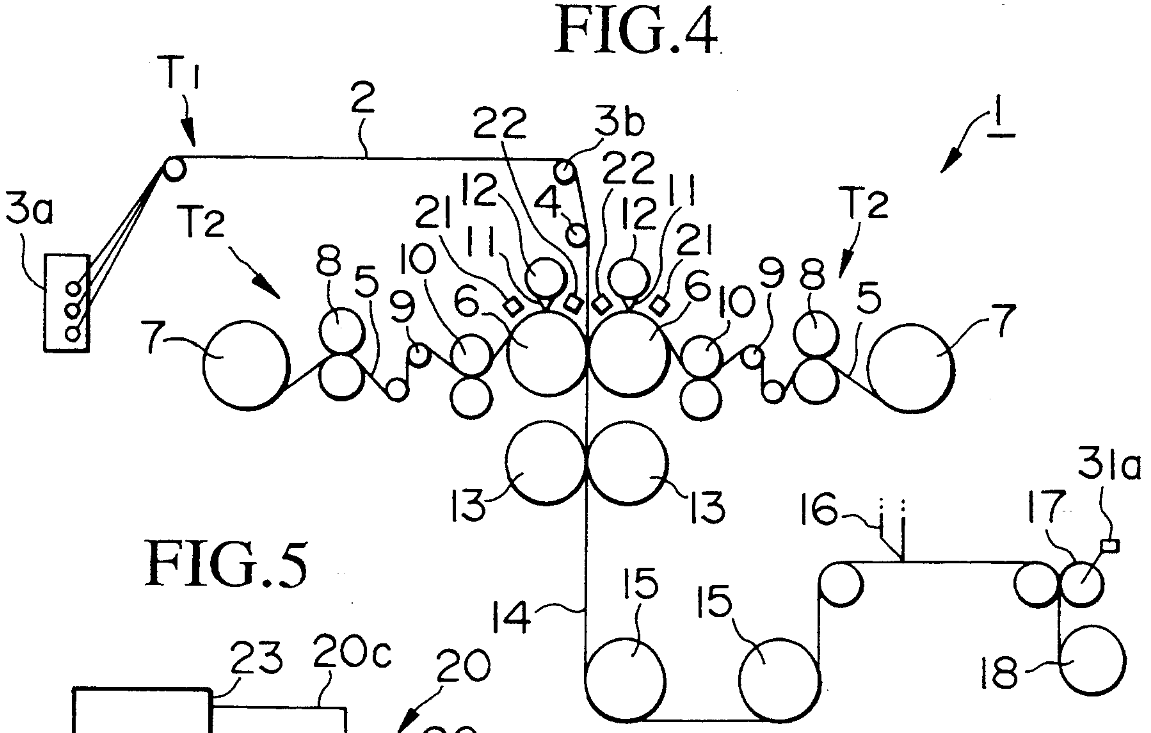
FIG. 4 is a schematic front elevational view of a flexible flat cable manufacturing apparatus in accordance with the present invention.
Figure 6:
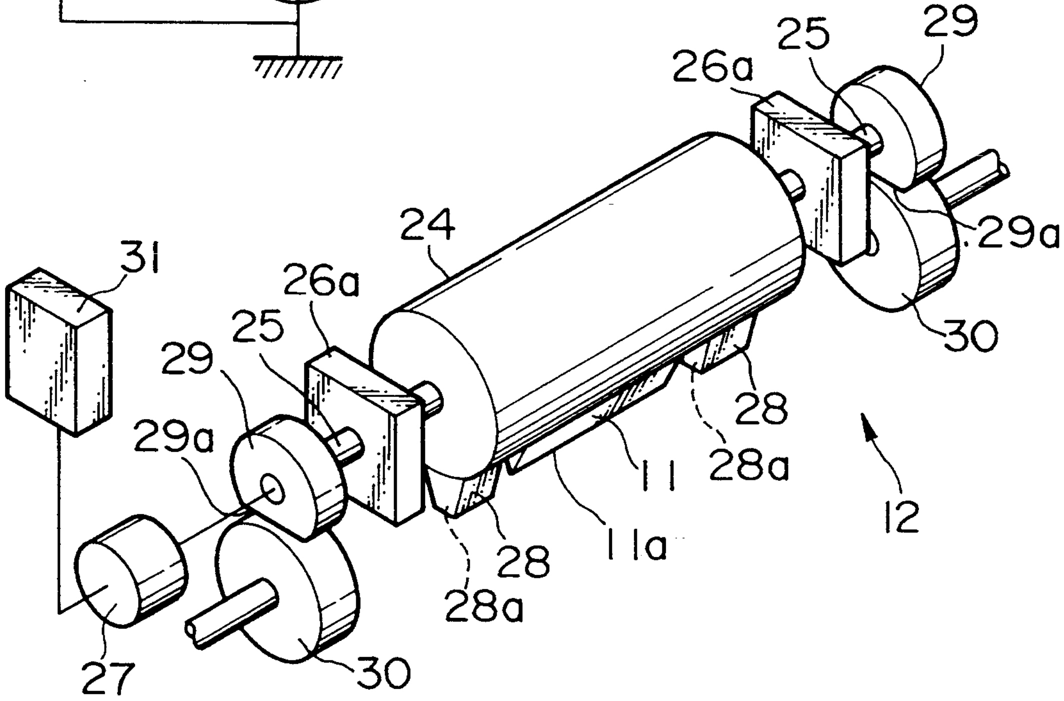
FIG. 6 is a perspective view of a cutting device used in the apparatus of FIG. 4.
Figure 15A:
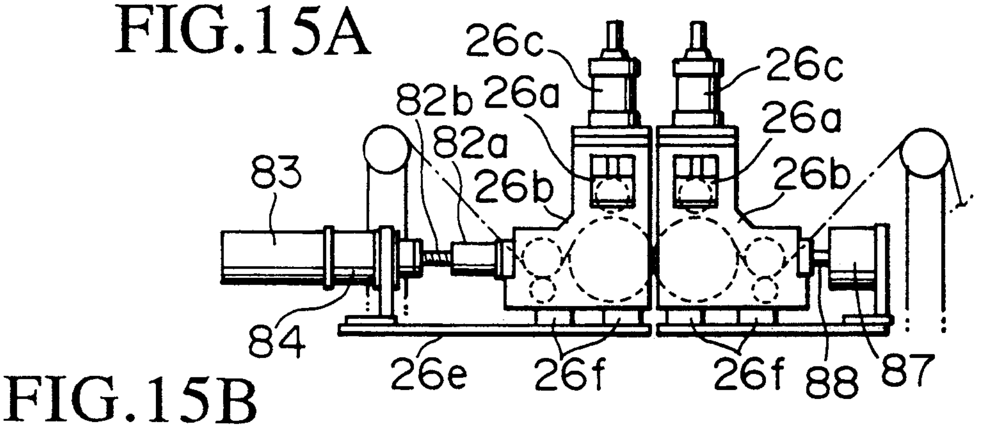
Figure 15B:
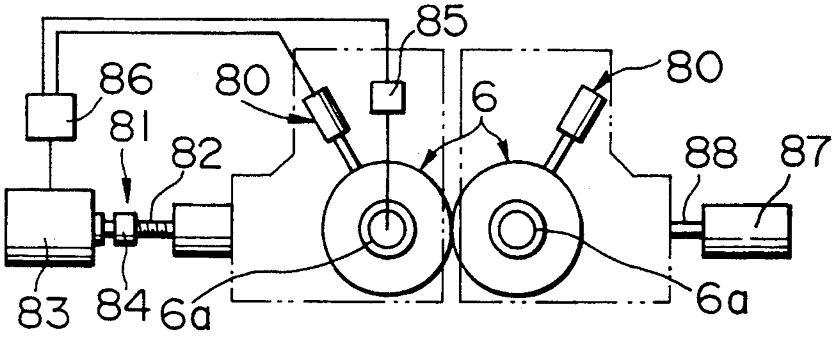
Figure 16:
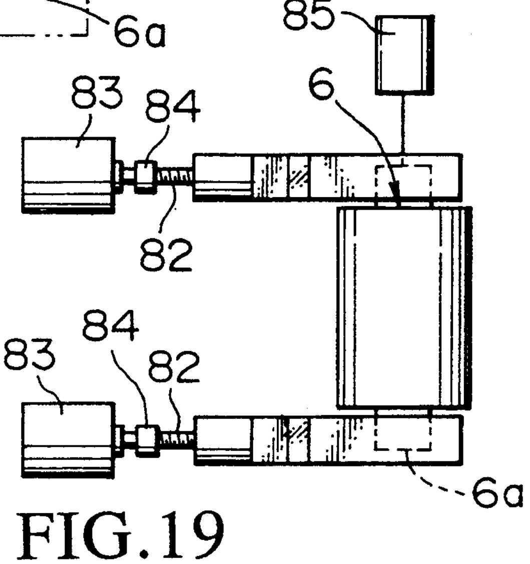
Figure 17:
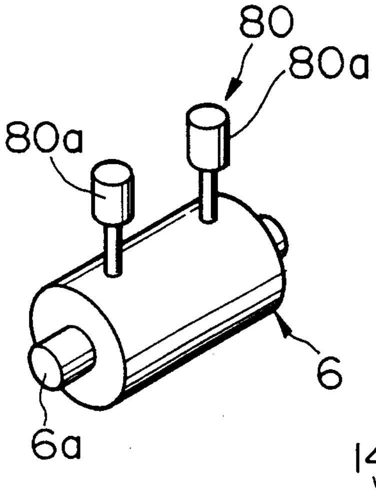
Figure 19:
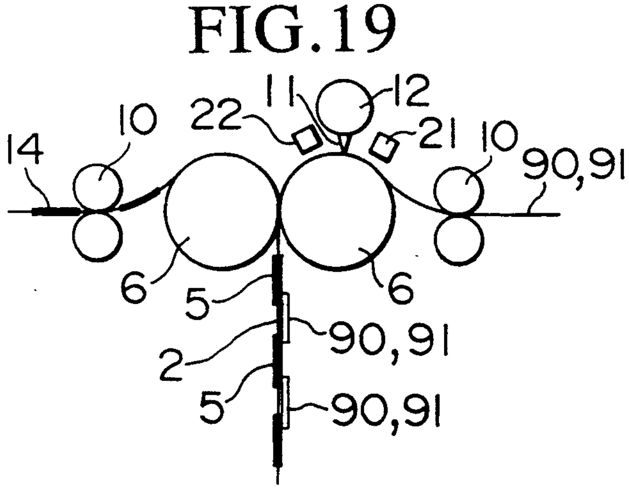

FIGS. **14*a*, 14*b* and 14*c* are schematic side elevational views showing the cutting operation by the cutting device of FIG. 6**;

FIG. **15*a* is a front elevational view of a part of the apparatus of FIG. 4**, showing means for moving hot rolls;

FIG. **15*b* is a schematic front elevational view of the part shown in FIG. 15*a***;

FIG. 16 is a schematic plan view showing means for moving one of the hot rolls;

FIG. 17 is a schematic perspective view of the hot rolls, showing dial gauges attached thereto;

FIG. 18 is a plan view of a flexible flat cable produced by the apparatus and method in accordance with the invention; and FIG. 19 is a schematic front elevational view of a bonding apparatus in accordance with the present invention, which is applied for bonding additional tapes to a flexible flat cable.

DESCRIPTION OF THE PREFERRED EMBODIMENTS OF THE INVENTION

FIGS. 4 to 17 depict an apparatus for bonding a sheet material in accordance with the present invention, which is illustrated as an apparatus for manufacturing a flexible flat cable.

The apparatus, generally designated by the numeral 1, comprises a first transferring device T1 for transferring a plurality of flat rectangular electric conductors 2 arranged parallel to one another and forming the elongated base materials, a pair of second transferring devices T2 for transferring a pair of insulating tape sheets 5 or strips (sheet materials) towards the electric conductors 2, a bonding device in the form of a pair of hot rolls 6 made of a suitable metal such as steel (for example JIS SKH 51), and a pair of cutting devices or cutter rolls 12 arranged above the hot rolls 6 for cutting discrete tapes from the insulating tape sheets 5 running on the hot rolls 6, respectively. Furthermore, a pair of static electricity generating devices 20 are disposed adjacent to the hot rolls 6, respectively, for generating static electricity on the insulating tape sheets 5 to cause the sheets 5 to adhere to the hot rolls 6, whereby the discrete tapes cut by the cutter rolls 12 are prevented from falling from the hot rolls 6 prior to the bonding step, see FIG. 5.

The first transferring device T1 includes a feeding roll assembly 3*a* for delivering the electric conductors 2 horizontally while keeping their parallel relation to one another, a guide roll 3*b* for guiding downwards the electric conductors 2 which are being delivered, and a pitch controlling roll 4 disposed under the guide roll 3*b* for adjusting the transverse pitch of the conductors 2. The hot rolls 6, which have axes of rotation parallel to each other, are arranged under the pitch controlling roll 4 in order to permit the electric conductors 2 and the insulating tape sheets 5 to run therebetween and thermally bonding them temporarily. Each of the second transferring devices T2 includes a delivery device or roll 7 disposed at a position which is spaced apart from a respective hot roll 6 for delivering a respective insulating tape sheet 5 at a prescribed speed towards the electric conductors 2 running between the hot rolls 6. Arranged between the delivery roll 7 and a respective hot roll 6 are a tape sheet-supply roll assembly 8 comprised of a pair of rolls and driven to further transfer the insulating tape sheet 5 delivered by the delivery roll 7, a dancer roll assembly 9 arranged so that one of two rolls is movable relative to the other for regulating the intervening distance therebetween in order to maintain the tension of the insulating tape sheet 5 at a constant value, and a transfer roll assembly 10, comprised of a pair of rolls, for transferring the insulating tape sheet 5 onto the hot roll 6 while controlling the transfer speed thereof.

The apparatus further includes a pair of hot rolls 13 of a suitable rubber arranged under the aforesaid hot rolls 6 for effecting a permanent bonding to provide a flexible flat cable blank 14, two cooling rolls 15 disposed under the permanent-bonding hot rolls 13 for cooling the flexible flat cable blank 14 running through the hot rolls 13, a slitter device 16 for cutting the widthwise marginal portions of the cooled flexible flat cable blank 14 to produce a finished flexible flat cable of a standard width, a drawing roll assembly 17 composed of a pair of rolls driven to draw the finished flexible flat cable, and a winding device 18 for taking up the flexible flat cable. The drawing roll assembly 17, the hot rolls 13 and so on also constitute the aforesaid first transferring device T1.

Figure 5:
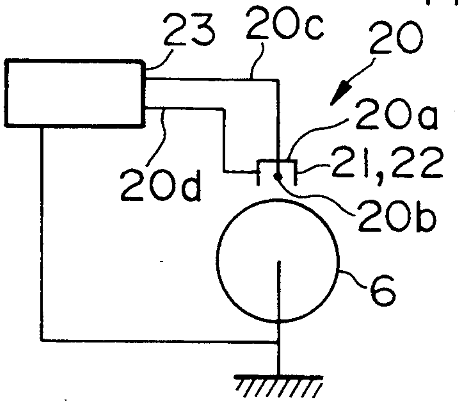
FIG. 5 is a schematic view of a device for generating static electricity used in the apparatus of FIG. 4.

As the static electricity generating devices 20, devices manufactured and sold by TREK under the trade name "Model 610C" and suitable static electricity electrodes may be combined. More specifically, the device 20 comprises a pair of static electricity electrodes 21 and 22 disposed above a respective hot roll 6 so as to sandwich the associated cutter roll 12 therebetween. Each electrode includes an elongated metal shield 20*a* of a channel shaped cross-section arranged parallel to the hot roll 6, and a tungsten wire 20*b* accommodated therein and extended therealong. As schematically shown in FIG. 5, the electrodes 21 and 22 are arranged in opposed relation to the outer peripheral surface of the hot roll 6 with an appropriate gap formed between the respective electrode and the hot roll 6, and the tungsten wires 20*b* of the electrodes 21 and 22 are electrically connected at one end to a D.C. high voltage electric source 23 through wires 20*c*, with both of the high voltage electric source 23 and the hot roll 6 being grounded. In addition, the high voltage electric source 23 and the metal shields 20*a* of the electrodes 21 and 22 are electrically connected to each other through feedback wires 20*d* which detect the static electricity scattered against and contained by the shield so that the high voltage electric source 23 is regulated so as to compensate for the loss of static electricity due to scatter.

Thus, when the insulating tape sheet 5 is delivered on the hot roll 6 and arrives at the two electrodes 21 and 22, static electricity is generated on the insulating tape or the static electricity generated thereon is further enhanced, so that the insulating tape sheet or the cut tapes are caused to adhere to the hot roll 6 without falling from the hot roll.

Figure 7:
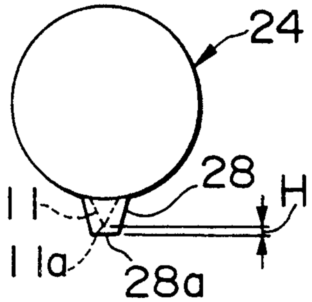
FIG. 7 is a schematic side elevational view showing a cutter blade and a cutter blade cam of the cutting device of FIG. 6.
Figure 8:
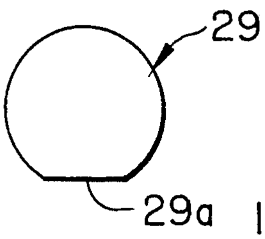
FIG. 8 is a schematic side elevational view showing a roll cam used in the cutting device of FIG. 6.
Figure 9:
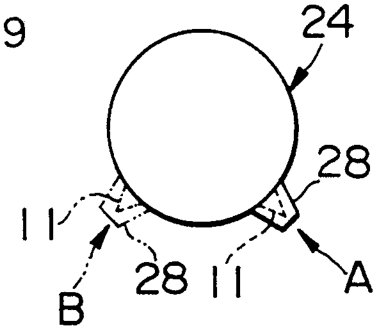
FIG. 9 is a schematic side elevational view showing positions of the cutter blade and the cutter blade cam of the cutting device before and after the cutting operation.

As best shown in FIG. 6, each cutter roll 12 includes a cylindrical roll body 24 having an axis of rotation therethrough and having a pair of supporting shafts 25 extending from opposite ends thereof in coaxial relation therewith. A pair of supporting frames 26*a*, which include a pair of bearing devices for rotatably supporting the shafts 25, are mounted on the shafts 25. In addition, as shown in FIG. 15*a*, a respective hot roll 6 and a respective transfer roll assembly 10 are rotatably supported on a pair of machine frames 26*b*, and the supporting frames 26*a* are accommodated in the machine frames 26*b*, respectively, for vertically sliding movement. A pair of pneumatic cylinder devices 26*c*, which are respectively mounted on top of the machine frames 26*b* are attached to the supporting frames 26*a* so as to be operative for urging the same downwards. As shown in FIG. 6, a drive device in the form of a servomotor 27 is connected to one of the shafts 25 for rotating the roll body 24. Provided on an outer surface of the roll body 24 so as to extend longitudinally thereof is a cutter blade 11 which tapers radially and outwardly from the roll body 24 so as to define an acute cutting edge 11*a* which extends parallel to the axis of the roll body 24. Naturally, the cutter blade 11 is dimensioned so as to have a length greater than the maximum width of the insulating tape sheet 5. Furthermore, a pair of cutter blade cams 28 are provided on the outer peripheral surface of the roll body 24 adjacent its opposite ends such that they are aligned with and spaced apart from the cutter blade 11. As viewed from the longitudinal axis of the roll body 24, each cutter cam 28 has a trapezoidal shape tapering radially and outwardly from the roll body 24, and its outermost surface 28*a*, that is, the surface facing downwards in FIG. 6, is formed at a position which is displaced slightly radially and outwardly from the cutting edge 11*a* of the cutter blade 11. In the illustrated example, the gap designated by the character H in FIG. 7 is set to a small positive value such as 3 micrometers.

Furthermore, in each cutter roll 12, a pair of disc-shaped roll cams 29 are securely fixed to the opposite ends of the supporting shafts 25. A part of the outer periphery of each roll cam 29 is removed to provide a notch defining a flat surface 29*a* which faces the direction in which the cutter blade 11 protrudes. In addition, a pair of disc-shaped cam supporters 30 are respectively mounted on the machine frames 26*b* so as to be respectively positioned adjacent to the roll cams 29. Thus, the roll cams 29 and the cam supporters 30 are constructed such that the roll cams 29 travel along the peripheral surfaces of the cam supporters 30, and as the flat surfaces 29*a* of the roll cams 29 are brought into contact with the cam supporters 30, the roll body 24 is moved down until the outermost surfaces 28*a* of the cutter blade cams 28 are brought into contact with the hot roll 6. More specifically, they are constructed such that, when the cutter blade 11 arrives at a position lying on a line connecting the axis of the cutter roll 12 and that of the associated hot roll 6, that is, when the cutter blade 11 reaches a position to cut the insulating tape sheet 5, the cutter roll 12 approaches the closest position to the hot roll 6, and the cutter blade cams 28 are held in contact with the hot roll 6.

Moreover, the servomotor 27 of the aforesaid cutter roll 12 is connected to a control unit 31, which receives a signal regarding the peripheral speed of the associated hot roll 6 and controls the peripheral speed of the cutter roll so as to synchronize its speed to that of the hot roll 6, immediately before and after the cutting operation, and which changes the peripheral speed of the cutter roll 12 in an arbitrary manner at other times. More specifically, a rotary encoder 31*a*, which is connected to the control unit 31, is attached to the drawing roll assembly 17 for detecting the rotation of the roll and generating pulses in response to the number of rotations detected. Furthermore, in the control unit 31, pulses are assigned to the positions of the cutter blade 11 before and after the cutting operation, as indicated by the characters A and B in FIG. 9, and the cutter roll 12 on standby at the position A is driven at a prescribed timing so as to synchronize the peripheral speed of the cutter roll 12 to that of the hot roll 6. Thereafter, as the cutter blade 11 passes the position B, the cutter roll 12 is rotated at an increased peripheral speed until the cutter blade 11 returns to the standby position A. Subsequently, when the number of pulses counted by the rotary encoder 31*a* arrives at a predetermined value, the control unit 31 activates the servomotor 27 to commence the rotation of the cutter roll 12. Thus, the length of each discrete tape, that is, cutting pitch of the insulating tape sheet 5, can be controlled in the desired manner by adjusting the number of pulses.

Figure 10:
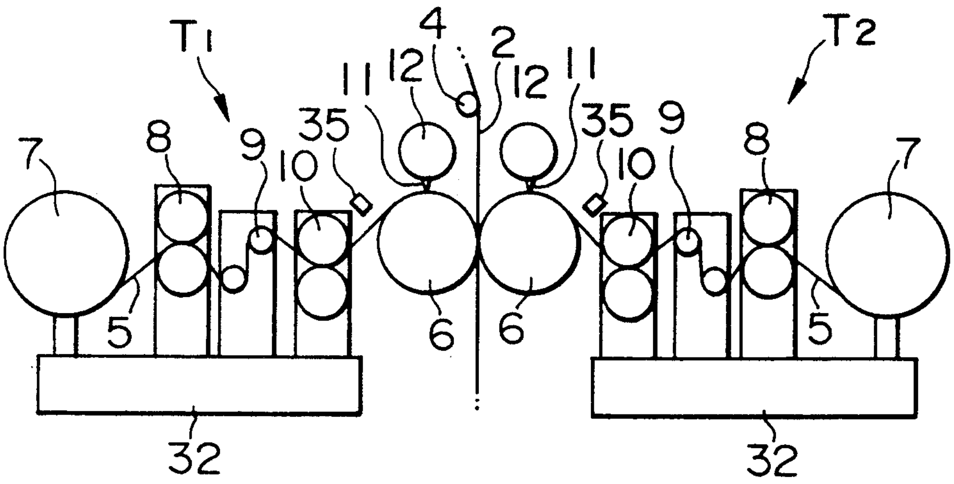
FIG. 10 is a front elevational view of an essential part of the apparatus of FIG. 4.
Figure 11:
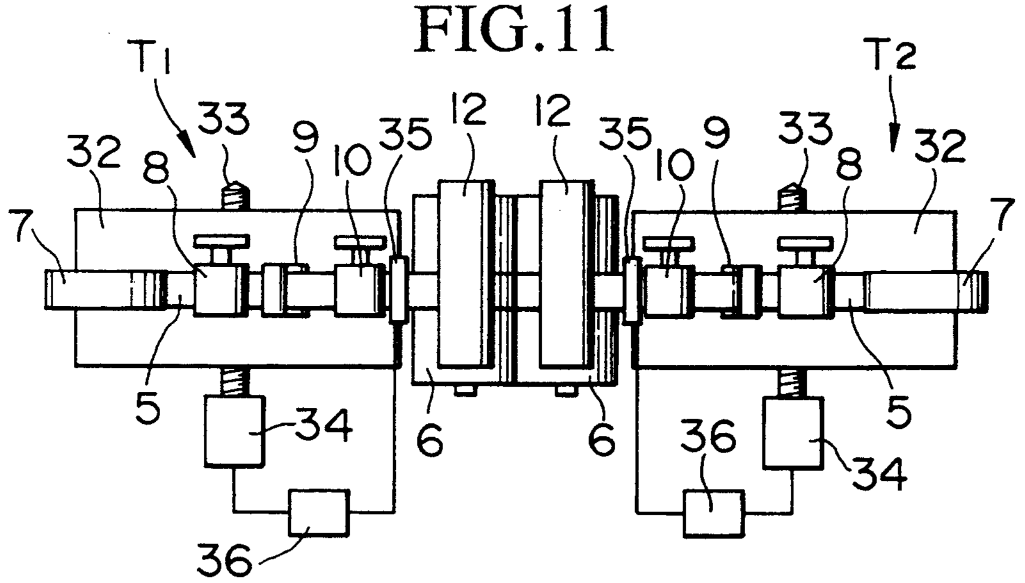
FIG. 11 is a plan view of the essential part shown in FIG. 10.

As depicted in FIGS. 10 and 11, the delivery roll 7, the tape sheet-supply roll assembly 8, the dancer rolls 9 and the transfer roll assembly 10 in each second transferring device T2 are all mounted on an elongated base 32 which includes an internally threaded guide aperture (not shown) extending transversely thereof. A ball screw 33, which has one end connected to a drive motor 34 such as a pulse motor capable of controlling the rotational angle, is threaded into the guide aperture of the base 32, and the base 32 is constructed so as to be movable in its widthwise direction by the activation of the drive motor 34.

Moreover, in each second transferring device T2, a sensing device 35 such as a CCD sensor is provided between the hot roll 6 and the transfer roll assembly 10 to detect the widthwise position of the insulating tape sheet 5 being transferred from the transfer roll assembly 10 to the hot roll 6, and a control device 36 is connected to the sensing device 35 and the drive motor 34. The control device 36 is operative to receive a signal outputted from the sensing device 35 and to drive the drive motor 34, taking into account the pitch of the ball screw 33, and consequently move the base 32, so that the undesirable shifting of the insulating tape sheet 5 relative to the electric conductors 2 is compensated. In the foregoing, the drive motor 34, the control device 36 and so on constitute a respective moving mechanism for moving the second transferring device T2 based on the signal outputted from the sensing device 35.

Figure 12:
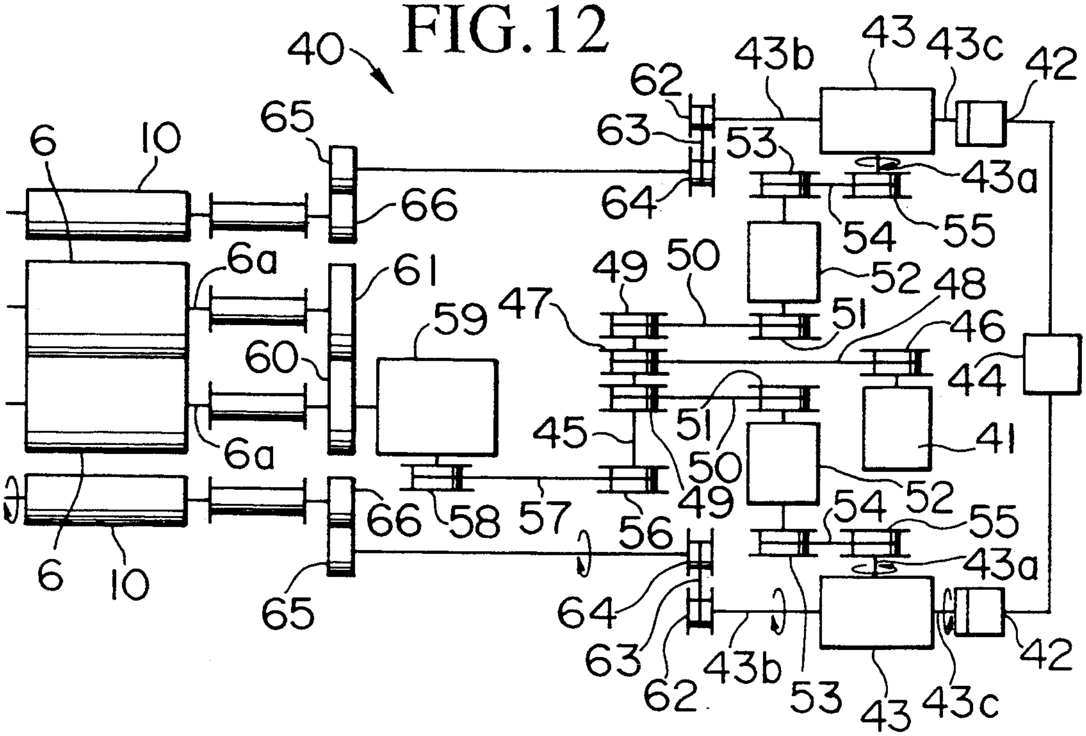
FIG. 12 is a schematic representation showing a principal drive device of the apparatus of FIG. 4.

Moreover, in the illustrated embodiment, the hot rolls 6 and the transfer roll assemblies 10 are constructed to be driven by a principal drive device 40 as diagrammatically depicted in FIG. 12. The drive device 40 includes a main motor 41 for generating a main driving force for rotation at a prescribed rotational speed, a pair of control motors 42 each operative to produce a rotational force at a variable rotational speed, a pair of differential gear mechanisms 43 each connected between the main motor 41 and a respective control motor 42, and a control unit 44 connected to the control motors 42. More specifically, the main motor 41 has an output shaft which is connected to a transmission shaft 45 through a belt-driven transmission including a pair of pulleys 46 and 47 and a belt 48 wound therebetween. Secured to the transmission shaft 45 so as to sandwich the pulley 47, are a pair of pulleys 49, each of which is further connected to an input shaft 43*a* of a respective differential gear mechanism 43 through a belt 50, a pulley 51, a non-stage transmission 52, a pulley 53, a belt 54 and a pulley 55. In addition, the transmission shaft 45 is connected through an additional pulley 56, a belt 57, a pulley 58 and a worm reduction gear 59 to a pair of gears 60 and 61 of the same tooth number which mesh with each other and are further connected to shafts 6*a* of the hot rolls 6, respectively. Thus, when the main motor 41 is activated, the driving force produced thereby is reduced at the worm reduction gear 59 and transmitted to the hot rolls 6, so that the hot rolls 6 are rotated at the same prescribed speed in opposite directions. Furthermore, each differential gear mechanism 43 is provided with an output shaft 43*b* and a control shaft 43*c*, and an AC servomotor serving as the control motor 42 is secured to the control shaft 43*c*, whereas the output shaft 43*b* is connected through a belt-driven transmission, including a pulley 62, a belt 63, a pulley 64, and a pair of meshing gears 65 and 66, and connected to a shaft of a driving roll in the transfer roll assembly 10.

Figure 13:
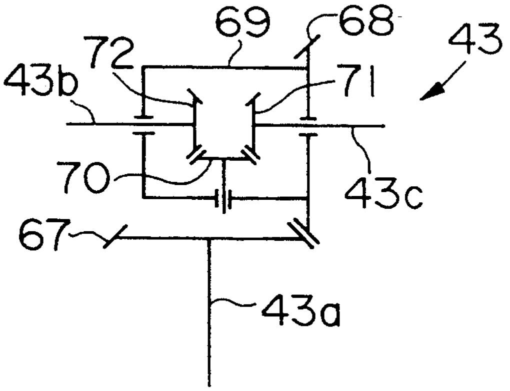
FIG. 13 is a schematic representation showing a differential gear mechanism used in the drive device of FIG. 12.

As shown in FIG. 13, the aforesaid differential gear mechanism 43 includes a bevel gear 67 to which the input shaft 43*a* is securely fixed, a bevel gear 68 meshing with the bevel gear 67 with its axis being arranged perpendicular to that of the bevel gear 67, and a casing or revolving arm 69 securely fixed to the bevel gear 68. Accommodated in the casing 69 are a bevel gear 70 rotatably supported thereon, and a pair of bevel gears 71 and 72 of the same tooth number each held in meshing engagement with the bevel gear 70. The control shaft 43*c* is rotatably supported on the casing 69 and securely fixed to the bevel gear 71, while the output shaft 43*b*, also supported rotatably on the casing 69, is securely fixed to the bevel gear 72.

With respect to the input shaft 43*a* , the output shaft 43*b* and the control shaft 43*c* in the aforesaid differential gear mechanism 43, their rotational speeds have the following relationship:

$$N1(t)+N2(t)=2\times N \quad (1)$$

where N is the rotational speed of the input shaft 43*a* which is constant, N1(*t*) is the rotational speed of the output shaft 43*b*, and N2(t) is the rotational speed of the control shaft 43*c*.

When the peripheral speed of the hot roll 6 is controlled so as to be equal to that of the transfer roll assembly 10, the rotational speed of the AC servomotor 42 is set to zero. Namely, $$N2(t)=0 \quad (2)$$

From the equations (1) and (2), the rotational speed of the output shaft 43*b* will be represented by $$N1(t)=2N.$$

Accordingly, the angular distance Vo traveled by the transfer roll assembly 10 after time T will be, $$Vo=\int_0^T N_1(t)dt=2N\int_0^T dt=2NT. \quad (3)$$

Further, when the transfer speed of the hot roll 6 is decreased with respect to that of the transfer roll assembly 10 in order to provide lead openings for conductors 2 in the flexible flat cable, since the aforesaid equations lead to $$N1(t)=2\times N(t)-N2(t)$$

the angular distance traveled by V the transfer roll assembly 10 after time T will be $$V=\int_0^T N_1(t)dt=2NT-\int_0^T N_2(t)dt. \quad (4)$$

The length of the lead opening, indicated by the character L in FIG. 18, is derived as a difference in the angular distance traveled by the transfer roll assembly 10. Namely, $$Vo-V=2NT-\left(2NT-\int_0^T N_2(t)dt\right)=\int_0^T N_2(t)dt. \quad (5)$$

Vo−V indicates the difference between the angular distance of the transfer roll assembly at the steady state operation and that of the transfer roll assembly at the cutting operation, i.e., the length of the spacing or lead opening for conductors.

Therefore, it is concluded that the length of the lead opening is regulated by changing the rotational speed of the AC servomotor 42.

In the foregoing drive device, the worm reduction gear 59 and the non-stage transmission 52 are appropriately set, such that when the rotational speed of the AC servomotor 42 is zero, the rotational speeds of the hot roll 6 and the transfer roll assembly 10 are set equal to each other.

Furthermore, as shown in FIGS. 15*b* to 17, a pair of sensing devices 80 are attached to the hot rolls 6, respectively, for detecting positions of the outer peripheral surfaces of the hot rolls 6 to generate signals indicating such positions. As best shown in FIG. 17, each sensing device 80 is comprised of a pair of position sensors in the form of dial gauges 80*a* which are arranged on the outer peripheral surface of the hot roll 6 so as to be spaced from and aligned with each other in a longitudinal direction of the hot roll 6, and which are held in contact with the outer peripheral surface of the hot roll 6. In addition, an adjusting device 81 is attached to one of the hot rolls 6, that is, the left hot roll in FIG. 15, for moving the one hot roll 6 towards and away from the other hot roll 6, based on the signal outputted from the sensing device 80 on the one hot roll, in order to keep a uniform bonding position between the hot rolls 6. More specifically, one of the pairs of machine frames 26*b*, which are situated on the left-hand side in FIG. 15*a* and are hereinafter called the left machine frames 26*b*, are arranged so that they are movable both towards and away from the other (right) machine frames 26*b*. The adjusting device 81 includes a pair of nut members 82*a* fixed and secured to the left machine frames 26*b*, a pair of ball screws 82*b* threaded into the nut members 82*a* and positioned parallel to each other and perpendicular to the long axis of the hot roll 6, and a pair of control motors such as servomotors 83 connected to an end of each of the respective ball screws 82 through suitable couplings 84 for turning the ball screws 82 along the long axis. The left machine frames 26*b* on which the nut members 82*a* are fixed and secured, are placed on a base 26*e* with slides 26*f* so as to be movable both towards and away from the right machine frames 26*b*. In addition, an angle sensor 85 is attached to one of the shafts 6*a* of the aforesaid left hot roll 6, and a control unit 86 is connected to the angle sensor 85 and the sensing device 80 on the left hot roll 6 for controlling the servomotors 83 based on the signals outputted from the angle sensor 85 and the sensing device 80. More specifically, during the non-operating time, the position of the outer peripheral surface of the left hot roll 6 is detected by the dial gauges 80*a* thereon, and the information from these dial gauges 80*a* as well as the information from the angle sensor 85 are inputted to the control unit 86. For example, the position of the outer surface of the left hot roll 6 is detected by the dial gauges 80*a* over the entire peripheral surface thereof, and its average value is calculated from the measured values. If a value detected, with respect to a certain position on the surface of the left hot roll, is greater than the average, then that hot roll 6 is moved in a direction away from the other right hot roll 6, by an amount corresponding to the difference detected, when the hot rolls 6 are positioned for bonding. This compensation is carried out over the entire periphery of the left hot roll 6, and during the rotation of the hot rolls 6, the position of this hot roll 6 is adjusted by the control unit 86.

Furthermore, with respect to the right hot roll 6, deviations or the like on the outer peripheral surface thereof are detected by the dial gauges 80*a* and then the hot roll 6 is arranged so that the gap between the hot rolls 6 exceeds a prescribed value. In addition, as shown in FIG. 15*a*, the right machine frames 26*b* are placed on the base 26*e* with slides 26*f* so as to be movable both towards and away from the left machine frames 26*b*, and a pair of pneumatic cylinder devices 87 are mounted on the base 26*c* with their cylinder rods 88 respectively aligned with the ball screws 82, and attached to the left hot roll 6, with the distal ends of the cylinder rods 88 securely and respectively fixed to the right machine frames 26*b*. Thus, the pneumatic cylinder devices 87 are operative to absorb the movement of the left hot roll 6 caused by the traveling of the conductors 2 and the insulating tapes.

The method of manufacturing a flexible flat cable using the aforesaid apparatus will now be described.

Before operating the apparatus, the two insulating tape sheets 5 which were formed in advance so as to have a prescribed width in conformity with the finished products are wound on the respective delivery rolls 7. At first, each insulating tape sheet 5 thus prepared is delivered from a respective delivery roll 7 through the tape-supply roll assembly 8 and the dancer rolls 9, and is transferred toward the hot roll 6 by the transfer roll assembly 10 at a transfer speed identical to the peripheral speed of the hot roll 6, whereby the insulating sheet travels along the outer peripheral surface of the hot roll 6. As the insulating tape sheet 5 arrives at a prescribed position on the hot roll 6, static electricity is generated thereon by the electrode 21, and hence the insulating tape sheet 5 is electrostatically adhered to the hot roll 6 (see FIG. 14*a*).

As each insulating tape sheet 5 travels from the transfer roll assembly 10 to the hot roll 6, a respective sensing device 35 detects its widthwise position producing an output signal, and consequently the control device 36 starts calculating the amount of the widthwise shifting of the insulating tape sheet 5 with respect to the conductors 2, based on the output signal, and activates the drive motor 34 to move the base 32 to compensate for the widthwise shifting of the insulating tape sheet 5.

Figure 14A:
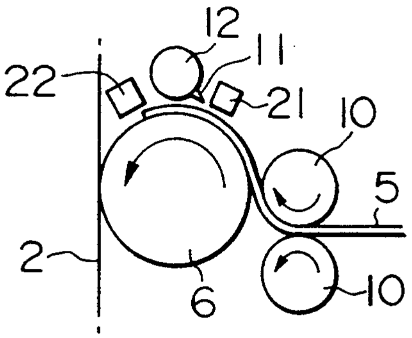
Figure 14B:
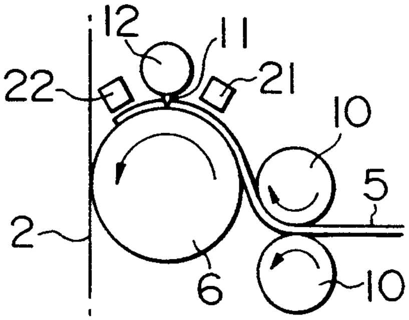
Figure 14C:
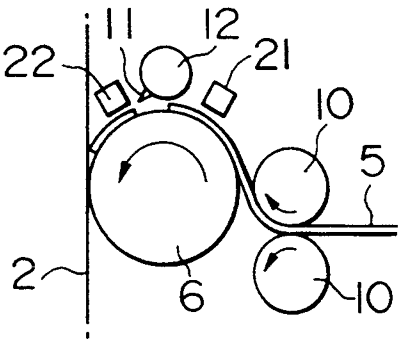

While the insulating tape sheet 5 adhered to the hot roll 6 is transferred by the rotation of the hot roll 6, the rotating cutter roll 12 arrives at a cutting position (uppermost position of the hot roll 6) and cuts, by its cutting edge 11*a*, the insulating tape sheet 5 (see FIG. 14*b*). Although in FIG. 14*b*, only one side is shown, both of the insulating sheets 5 are cut at the same time in the same manner. During the cutting operation, when the cutter blade 11 arrives at the cutting position, the cutter blade cam 28 is brought into contact with the outer peripheral surface of the hot roll 6 to prevent the cutter blade 11 from abutting the hot roll 6. Therefore, the functional lifetime of both the cutter blade 11 and the hot roll 6 can be prolonged, and any potential scratches on the hot roll 6 can be avoided. Furthermore, the cutter roll 12 on standby in front of the cutting position is driven to rotate at a prescribed timing and the peripheral speed of the cutter roll is synchronized to that of the hot roll 6. Then, after the cutter blade 11 has finished cutting the insulating tape sheet 5 and passes a prescribed position behind the cutting position, the peripheral speed of the cutter roll 12 is increased until the cutter blade 11 returns to the standby position A. Thereafter, when the number of pulses counted by the rotary encoder 31*a* arrives at a predetermined value, the control unit 31 again activates the servomotor 27 to commence the rotation of the cutter roll 12. Thus, the length of each discrete tape, that is, the cutting pitch of the insulating tape sheet 5, can be controlled in the desired manner.

Subsequently, as the discrete insulating tape which has been cut from the insulating sheet material travels on the peripheral surface of the hot roll 6 and arrives at the remaining electrode 22, the electrostatic adhering force of the insulating tape to the hot roll 6 is further enhanced by the static electricity which is newly generated by the electrode 22, or the weakened adhering force is compensated thereby.

Furthermore, in the illustrated embodiment, immediately after the completion of the cutting step, the AC servomotor 42 is activated by the control unit 44 to be rotated at a prescribed rotational speed, so that the rotation of the output shaft 43*b*, that is, the rotation of the transfer roll 10, is temporarily delayed by a prescribed number of pulses. With this operation, a prescribed spacing is formed between the tail end of the cut tape and the leading end of the sheet to be cut (see FIG. 14*c*). Thereafter, the spacing, which serves as the length of the lead openings, is maintained by stopping the AC servomotor 42, and the cut insulating tape and the insulating sheet material to be cut are transferred at the same speed.

The discrete insulating tapes thus formed are both transferred between the hot rolls 6 at a speed synchronized to that of the conductors 2, and temporarily bonded to the conductors 3 by heat while being removed from the hot rolls 2. Then, the conductors 2 with the discrete insulating tapes bonded to the opposite sides of the conductors 2 are further caused to travel through the hot rubber rolls 13, during which the insulating tapes are permanently bonded to the conductors 2. A flexible flat cable 14 thus produced is cooled by the cooling rolls 15, drawn by the drawing rolls 17, and taken up on the winding device 18. In the foregoing, if the insulating tape sheet 5 is formed so as to have a slightly greater width, the widthwise marginal portions of the resulting flexible flat cable would be trimmed by the slitting device 16 along the line Y indicated in FIG. 18.

In the apparatus as described above, since the static electricity generating devices 20 are attached to the hot rolls 6, the insulating tape sheets or discrete tapes cut therefrom can be caused to adhere to the hot rolls 6 by the static electricity generated thereon. Therefore, the insulating tapes can be prevented from falling from the hot rolls 6 prior to the bonding step. Accordingly, it becomes possible to cut the insulating tape sheets 5 into discrete tapes prior to the bonding step.

Furthermore, since the insulating tape sheets 5 are cut into discrete tapes and subsequently bonded to the electric conductors 2, it is not necessary to form holes in the insulating tape sheets and to remove the connecting portions thereof, resulting in a substantial reduction of raw materials. In this regard, when a insulating tape sheet of a greater width is used, those marginal portions outside the two-dot and dash line Y in FIG. 18 are only to be removed as debris. In addition, since no holes are formed in the insulating tape sheets 5, it is not necessary to use a press machine. Accordingly, the resetting of the press machine for the manufacture of flexible flat cables of different sizes is not required, resulting in an enhanced productivity thereof. Furthermore, since the operating noise of the press machines can be avoided, the working environment is substantially improved.

In addition, the cutter cams 28 are provided in each cutter roll 12 in order to maintain a constant gap between the cutter blade 11 and the hot roll 6 during cutting of the heat insulating sheets 5. Therefore, the service lives of both the cutter blades 11 and the hot rolls 6 can be prolonged, and any scratches or the like can be prevented from occurring on the hot rolls 6.

Moreover, due to the provision of the roll cams 28, the cutter roll 12 is caused to approach the associated hot roll 6 gradually after it has arrived at a prescribed position in front of the cutting position, and is positioned at an optimal position for cutting when it has arrived at the cutting position. Then, after having passed the cutting position, the cutter roll 12 is caused to gradually move away from the hot roll 6, and after the arrival at a prescribed position behind the cutting position up to the aforesaid front position, the distance between the cutter roll 12 and the hot roll 6 can be maintained at a constant. Consequently, any impact that may be caused by the running on or kicking out of the cutter roll 12 against the hot roll 6 can be avoided, and consequently a smooth rotation of the hot rolls can be ensured. In addition, since the length of the discrete tapes or the spacing between the cut tapes can be maintained stably due to the smooth rotation of the hot rolls 6, the resulting flexible flat cable has excellent quality.

Further, because the peripheral speed of the cutter roll 12 can be controlled in a desired manner, the cutter roll 12 can be returned at an increased speed to the standby position after the cutting operation. Therefore, it is very easy to change the length of the discrete insulating tapes, that is, the cutting pitch of the tape sheet. Moreover, in the aforesaid apparatus, the spacing between the discrete-tapes are to be formed on a respective hot roll 6, and the path line from the formation of the spacing to the bonding is very short and remains on the same hot roll 6. Accordingly, any shifting during the bonding can be maintained at a minimum. In addition, at the commencement of the operation, it is easy to align the insulating tape sheets 5 with each other, so that the time required for the initial setting of the apparatus, as well as debris produced during the initial setting, can be substantially reduced.

Furthermore, in the aforesaid apparatus, as the rotational speeds of the control motors 42 are changed and maintained at the changed speed for a prescribed number of pulses by the control unit 44, the differential gear mechanisms 43 operate to reliably reduce the rotational speeds of the transfer roll assemblies 10 by the prescribed amount and maintain the reduced speeds through the prescribed number of pulses. Accordingly, a spacing of a desired distance serving as a lead opening for the conductors 2 can be formed between the cut discrete insulating tape and the insulating tape sheet to be cut. Also, discrete tapes of uniform length, which are successively produced, are continuously bonded to the electric conductors 2 while keeping the aforesaid spacing.

Moreover, because any shifting of the insulating tape sheets 5 being transferred on the hot rolls 6 can be prevented by the operation of the control unit 36 which adjusts the widthwise position of the base 32, a proper and accurate positioning of the insulating tapes can be ensured throughout the bonding operation. In addition, the insulating tape sheets 5 are not moved by any moving rollers or the like, but the bases 32 each of which supports the delivery roll 7, the tape-supply roll assembly 8, the dancer rolls 9 and the transfer roll assembly 10, are moved to compensate the shifting of the insulating tape sheets 5. Therefore, the insulating tape sheets can be transferred to the bonding position in a smooth and stable manner without causing any weaving movement even during the compensating operation of the shifting.

Furthermore, the insulating tape sheets 5 are prepared in advance to have a width in conformity with that of the finish product, and are bonded to the conductors 2 while adjusting their widthwise positions to that of the conductors 2 which have been conveyed with their widthwise positions being kept uniform. Accordingly, any trimming operation after the bonding is no longer required, so that the manufacturing cost of a flexible flat cable can be substantially reduced.

Moreover, in the aforesaid apparatus, the position of one of the hot rolls 6 is compensated based on the data stored in the memory while the other hot roll 6 is operated by the pneumatic cylinder devices 87 so as to follow the movement of the one hot roll 6. Therefore, even if the hot rolls should deviate or form an inaccurate roundness, the bonding position between the hot rolls 6 can be maintained uniformly so that uneven pressing can be avoided. Accordingly, the pitches between the electric conductors 2 can be kept uniform, and a stable and excellent state of bonding of the insulating tapes to the conductors 2 can be ensured.

Furthermore, a simple adjustment of the rotational speeds of the transfer roll assemblies 10, the cutter rolls 12 and the like permits the manufacture of flexible flat cables of a variety of sizes.

Obviously, many modifications and variations of the present invention are possible in light of the above. For example, the hot rolls 6 may be replaced with the hot rolls 13 to omit the temporary bonding step when the insulating tapes and the conductors are of the types which can be very easily bonded to each other. In addition, the pneumatic cylinder devices attached to the other hot roll may be replaced by another adjusting mechanism. Furthermore, the adjusting mechanism of the hot rolls 6 could also be attached to the permanent-bonding hot rolls 13 in order to facilitate the passing of the flexible flat cable blank and to prevent any improper bonding.

Moreover, reinforcing tapes may be bonded to a flexible flat cable as described above in order to enhance the strength, or imido tapes may be bonded to the flexible flat cable to enhance heat-resistance and anti-bending characteristics. The bonding apparatus of the invention may be modified to manufacture such a flexible flat cable as depicted in FIG. 19, in which the same numerals are used to denote the parts or members common with the previous embodiment. This modified apparatus includes a first transferring device T3 for transferring a flexible flat cable blank 14 serving as an elongated base material, a second transferring device T4 for transferring a reinforcing tape 90 or an polyimido resin tape 91 towards the flexible flat cable 14, a pair of hot rolls 6 of the same construction as that described above for bonding the reinforcing or imido tapes to the flexible flat cable 14, and a cutting device 12 in the form of a cutter roll of the same construction as that described above arranged for cutting discrete tapes from the reinforcing or polyimido resin tape sheet prior to the bonding operation. As is the case with the previous embodiment, the static electricity generating device 20 including the two electrodes 21 and 22 is arranged on the hot roll above which the cutting device is arranged. Furthermore, the bonding apparatus and method of the invention may be applied to any other apparatuses or methods in which the bonding of the sheet materials must be carried out while transferring the sheet materials.

Finally, the present application claims the priorities of Japanese Patent Application No. 4-104962 filed Apr. 23, 1992, Japanese Patent Applications Nos. 4-131091, 4-131092 and 4-131093 filed May 22, 1992, and Japanese Patent Application No. 4-197264 filed Jul. 23, 1992, which are all incorporated herein by reference.

What is claimed is:

1. A method for manufacturing a flexible flat cable, comprising the steps of:
- transferring a plurality of electric conductors arranged in an elongated manner;
- transferring a pair of insulating tape sheets towards said electric conductors;
- causing said electric conductors and said insulating tape sheets to run between a pair of hot rolls to thermally bond said conductors and said tape sheets;
- cutting discrete tapes from said insulating tape sheets adhered to said hot rolls prior to bonding; and
- generating static electricity on said insulating tape sheets to cause said sheets to adhere to said hot rolls, whereby said discrete tapes are prevented from falling from said hot rolls prior to bonding.

2. An apparatus for manufacturing a flexible flat cable, comprising:
- a first transferring device for transferring a plurality of electric conductors arranged in an elongated manner;
- a pair of second transferring devices for transferring a pair of insulating tape sheets towards said electric conductors;
- a pair of hot rolls having axes of rotation parallel to each other and constructed to permit said electric conductors and said insulating tape sheets to run therebetween and thermally bonding said conductors and said tape sheets;
- a pair of cutting devices disposed adjacent to said hot rolls, respectively, for cutting discrete tapes from said insulating tape sheets prior to bonding; and
- a pair of static electricity-generating devices disposed adjacent to said hot rolls, respectively, for generating static electricity on said insulating tape sheets to cause said sheets to adhere to said hot rolls, whereby said discrete tapes are prevented from falling from said hot rolls prior to bonding.

3. An apparatus as recited in claim 2, wherein each of said static electricity-generating devices comprises high voltage source means and static electricity electrode means arranged in opposed relation to a respective hot roll and electrically connected to said high voltage source means.

4. An apparatus as recited in claim 2, wherein each of said cutting devices comprises a cutter roll disposed adjacent to a respective one of said hot rolls and having an axis parallel to said axis of rotation of said respective hot roll, said cutter roll having a cutter blade provided thereon, said cutter roll having cutter cam means provided thereon and constructed to be held in abutment with said respective hot roll to maintain a gap between said cutter blade and said respective hot roll during cutting of said insulating tape sheet.

5. An apparatus as recited in claim 4, wherein each of said cutting devices comprises roll cam means attached to said cutter roll for bringing said cutter roll into immediate proximity with said respective hot roll when said insulating tape sheet arrives at a cutting position.

6. An apparatus as recited in claim 2, further comprising a drive device attached to said hot rolls and said second transferring devices for driving said hot rolls and said second transferring devices in association with each other, said drive device including a main motor for rotating said hot rolls at a prescribed rotational speed, a pair of differential gear mechanisms each having an input shaft connected to said main motor, an output shaft connected to a respective second transferring device and a control shaft, a pair of control motors each mounted on a respective control shaft and being operative to produce a rotational force of a variable rotational speed, and control means connected to said control motors for controlling said control motors so as to control the rotational speed of the control motors, each of said differential gear mechanisms being operative to change a rotational speed of a respective output shaft relative to a rotational speed of a respective input shaft when a rotational speed of a respective control shaft is changed.

7. An apparatus as recited in claim 2, wherein each of said second transferring devices comprises a transfer roll assembly disposed adjacent to a respective hot roll for causing said insulating tape sheet to travel towards a respective hot roll, further comprising a pair of sensing devices each arranged between a respective transfer roll assembly and a respective hot roll for sensing a widthwise position of said insulating tape sheet being transferred from said transfer roll assembly to said bonding device to produce a signal indicating a widthwise deviation of the insulating tape sheet, and a pair of moving mechanisms each attached to a respective second transferring device for moving a respective second transferring device widthwise with respect to said insulating tape sheet based on said signal from said respective sensing device to eliminate said widthwise deviation.

8. An apparatus as recited in claim 2, further comprising a pair of sensing means each attached to a respective hot roll for sensing a position of an outer peripheral surface of the hot roll to produce a signal indicative of said the position of the outer peripheral surface of the hot roll, and adjusting means attached to at least one of said hot rolls for moving at least one of said hot rolls based on said signal from said sensing device to thereby maintain a uniform bonding position between said hot rolls.

* * * * *